United States Patent
Epstein

(10) Patent No.: US 9,107,172 B1
(45) Date of Patent: Aug. 11, 2015

(54) METHOD AND APPARATUS FOR MANAGING COEXISTENCE INTERFERENCE

(75) Inventor: Bracha Epstein, Beit Shemesh (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 1560 days.

(21) Appl. No.: 12/235,169

(22) Filed: Sep. 22, 2008

Related U.S. Application Data

(60) Provisional application No. 60/973,905, filed on Sep. 20, 2007, provisional application No. 60/973,896, filed on Sep. 20, 2007.

(51) Int. Cl.
H04B 1/00 (2006.01)
H04W 52/24 (2009.01)
H04W 52/04 (2009.01)

(52) U.S. Cl.
CPC ............ *H04W 52/243* (2013.01); *H04W 52/04* (2013.01)

(58) Field of Classification Search
USPC ........................................ 455/69, 67.13, 522
See application file for complete search history.

(56) References Cited

U.S. PATENT DOCUMENTS

| | | | |
|---|---|---|---|
| 2002/0155811 A1 | 10/2002 | Prismantas et al. | |
| 2002/0196766 A1* | 12/2002 | Hwang et al. | 370/342 |
| 2006/0121853 A1 | 6/2006 | Madhaven et al. | |
| 2006/0252418 A1* | 11/2006 | Quinn et al. | 455/423 |
| 2007/0110005 A1* | 5/2007 | Jin et al. | 370/335 |
| 2008/0119215 A1* | 5/2008 | Ji et al. | 455/522 |

OTHER PUBLICATIONS

U.S. Appl. No. 12/235,418, filed Sep. 22, 2008, in the name of Epstein.
U.S. Appl. No. 12/240,488, filed Sep. 29, 2008, in the name of Epstein et al.
Office Action mailed Jul. 21, 2011 in U.S. Appl. No. 12/240,488.

* cited by examiner

*Primary Examiner* — Hsin-Chun Liao

(57) ABSTRACT

The present disclosure allows for a wireless device that can include a transceiver that transmits a radio frequency (RF) signal at an RF power level. The RF signal can propagate through an RF environment that is shared by multiple interference-susceptible wireless devices. The wireless device can also include an interference-identifier module that determines if the RF signal decreases a measure of the integrity of another RF signal that is transmitted between two or more interference-susceptible wireless devices. The wireless device can also include a transmit power adjuster that adjusts the transmit power to increase the signal integrity metric when the interference-identifier module has determined that the RF signal has decreased the signal integrity metric. Alternatively, the wireless device may transmit a control message that is indicative of the identified coexistence interference to a remote transmitter. The control message may result in a transmit power adjustment of the remote transmitter.

49 Claims, 10 Drawing Sheets

| FROM \ TO | WiFi | CELL PHONE | GPS | BLUETOOTH |
|---|---|---|---|---|
| WiFi | x | (89,7;-1) | (3,0;-3) | (11,6;-2) |
| CELLPHONE | (71, 13;-4) | x | (7, 0;-5) | (37, 6;-3) |
| GPS | (1, 13;-0.5) | (5, 7;-2) | x | (2,6;-1) |
| BLUETOOTH | (11, 13;-8) | (41, 7;-4) | (5,0;-3) | x |

FIG. 9

METHOD AND APPARATUS FOR MANAGING COEXISTENCE INTERFERENCE

INCORPORATION BY REFERENCE

This application claims the benefit of U.S. Provisional Application No. 60/973,905, "WiFi Station Reduces Transmit Power Because of Coexistence Issues" filed on Sep. 20, 2007, and U.S. Provisional Application No. 60/973,896, "WiFi Station Request for Change in AP Association Because of Coexistence Issues" filed on Sep. 20, 2007, including all cited references, which are incorporated herein by reference in their entirety.

BACKGROUND

Wireless devices, such as a personal digital assistant (PDA), a Bluetooth (BT) interface, a cell phone, a global positioning system (GPS) and other wireless devices, may be active in a same environment, such as a shared radio frequency (RF) environment. The wireless devices may be located on a platform, such as a cell phone, a laptop computer, or other mobile device, or they may be located on different platforms in close proximity. For example, a cell phone platform or mobile handset may contain a cell phone transceiver, a WiFi device, and a BT adapter. In another example, a laptop computer may be in close proximity with a mobile handset. The laptop computer may include a WiFi device and a BT interface. The mobile handset may include a cell phone and a BT interface. Operations of a wireless device may interfere with operations of other wireless devices in the shared RF environment.

SUMMARY

The present disclosure describes an interference mitigator that can adjust the power of a wireless transmitter to improve the reception performance, signal quality, or data transfer of another interference-susceptible wireless device. The interference-susceptible wireless device may be located in the same platform or on different platforms. Adjustment may be by way of direct adjustment of power or through the transmission of a suitable control message to a remote transmitter that adjust its transmit power in response to the control message.

The present disclosure allows for a wireless device that can include a transceiver that transmits a radio frequency (RF) signal at an transmit power level. The RF signal can propagate through an RF environment that is shared by multiple interference-susceptible wireless devices. The wireless device can also include an interference-identifier module that determines if the RF signal affects a signal integrity of another RF signal associated with an interference-susceptible wireless device. The wireless device can also include a transmit power adjuster that adjusts, for example by reducing the transmit power to increase the signal integrity metric when the interference-identifier module has determined that the RF signal has decreased the signal integrity metric.

The present disclosure provides a method of adjusting a transmit power of a wireless device that can include transmitting an RF signal at the transmit power. The RF signal can propagate through an RF environment shared by multiple interference-susceptible wireless devices. The method can include calculating a measure of the integrity of another RF signal that is transmitted between one interference-susceptible wireless device and another interference-susceptible wireless device, then adjusting the transmit power based on the signal integrity metric.

Aspects of the present disclosure can provide for a wireless communications controller that can include a WiFi transceiver that transmits a RF signal at a given transmit power. The RF signal can propagate through an RF environment which is shared by multiple interference-susceptible wireless device. The wireless communication controller can include a coexistence interference manager (CIM) with an interference-identifier module and a transmit power adjuster. The interference-identifier module can determine that the RF signal affects a measure of signal integrity for a another RF signal that is transmitted between interference-susceptible wireless devices. The transmit power adjuster can increase the signal integrity by adjusting the transmit power.

The present disclosure provides a method for reducing bit errors in an interference-susceptible wireless device that shares a radio frequency (RF) environment with a WiFi wireless device. The method can include detecting the activity of the interference-susceptible wireless device by monitoring an RF transmission from the interference-susceptible wireless device, sensing the quality of the signal received by the interference-susceptible wireless device, and adjusting the transmit power from the WiFi wireless device to increase the signal quality metric.

The present disclosure provide for a wireless device that includes a WiFi transceiver that transmits an RF signal to a WiFi access point (AP) through an RF environment which is shared by an interference-susceptible wireless device. The wireless device can also include an interference identifier module that determines if the transmit power is likely to decrease the signal integrity for another RF signal that is received by the interference-susceptible wireless device. The wireless device can also include an adjuster that changes the transmit power to increase the integrity of the signal received by the interference susceptible wireless device.

Additionally, aspects of the disclosure can provide a user equipment for use in a shared radio frequency (RF) environment. The shared RF environment may include interference susceptive devices that operate according to at least a first wireless service and a second wireless service that is different from the first wireless service. The user equipment can include an RF interface that receives and transmits radio signals according to the first wireless service. Further, the user equipment can include an interference identifying module associated with the RF interface. The interface identifying module can be configured to identify an interference of signals of the first wireless service and the second wireless service. Further, the user equipment can transmit a control signal that is indicative of the identified interference.

Further, aspects of the disclosure can provide a cellular network that can provide a cellular service in a shared radio frequency (RF) environment. The shared RF environment may include interference susceptive devices that operate according to at least one other wireless service in addition to the cellular service. The cellular network can include at least a user equipment and at least a base station. The user equipment can include an RF interface that receives and transmits radio signals according to the cellular service within the shared RF environment. Further, the user equipment can include an interference identifying module associated with the RF interface. The interface identifying module can be configured to identify an interference of signals within the shared RF environment. The user equipment may transmit a control signal that is indicative of the identified interference. The base station can be configured to receive the control signal transmitted by the user equipment, and adjust transmit power based on the control message that is indicative of the interference of signals within the shared RF environment.

BRIEF DESCRIPTION OF THE DRAWINGS

The disclosure will refer to the accompanying figures, wherein like numerals represent like elements, and wherein:

FIG. 9 is a data structure for interference strength and susceptibility according to an embodiment.

DETAILED DESCRIPTION OF EMBODIMENTS

Figure 1:
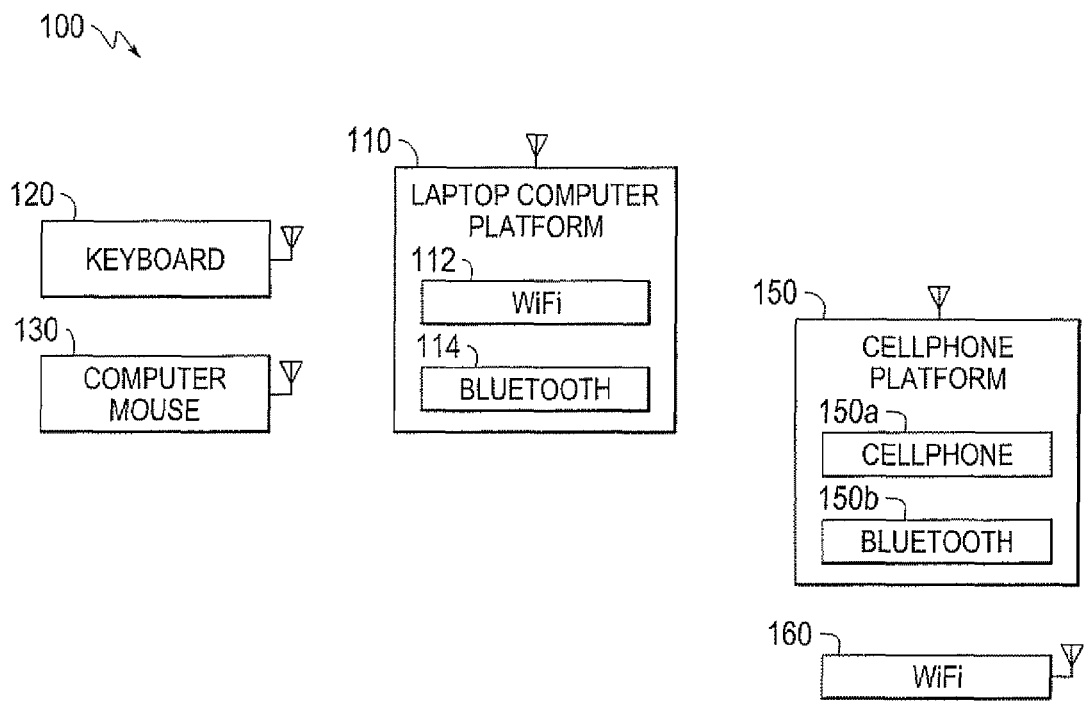
FIG. 1 is an example of a configuration of multiple wireless devices in a shared radio frequency (RF) environment.

FIG. 1 is an example of a configuration 100 of multiple wireless devices in a shared radio frequency (RF) environment. The configuration 100 can include a laptop computer platform 110, a keyboard 120, a computer mouse 130, a cell phone platform 150, and a WiFi device 160. These devices may communicate over a shared RF environment.

The cell phone platform 150 can include a cell phone 150a, a BT device 150b, and other wireless devices. The cell phone 150a may communicate with a base station (BS) over the shared RF environment. The cell phone 150a may be configured as at least one of a GSM device, a UMTS device, a PCS device, a long term evolution (LTE) device, a global packet radio system (GPRS) device, an EDGE device, a 1xRTT device, an evolution data only (EV-DO) device, and a code-division multiple access (CDMA) device. The BT device 150 may communication with another Bluetooth device over the shared RF environment.

The laptop computer platform 110 can communicate with the keyboard 120 and the computer mouse 130 over the shared RF environment. Additionally, the laptop computer platform 110 can include a WiFi device 112 and a BT device 114 that is co-located with the WiFi device 112, and other suitable wireless devices. For example, the laptop computer platform 110 can include wireless devices such as a global positioning system (GPS), a ZigBee device, a Wibree device, a wireless USB device, an ultra-wideband (UWB) device, an EnOCean device, a 6loWPAN device, an iBurst device, and the like.

The WiFi device 112 can communicate with the WiFi device 160 or other WiFi devices (not shown). For example, the WiFi device 160 can serve as an access point (AP) for the WiFi device 112. The WiFi device 112 may interfere with the cell phone platform 150, the keyboard 120, the computer mouse 130, the cell phone 150a, the BT device 150b, the co-located BT device 114, and the like. In other words, the WiFi device 112 can interfere with co-located wireless devices, such as BT device 114 or external wireless devices.

Figure 2:
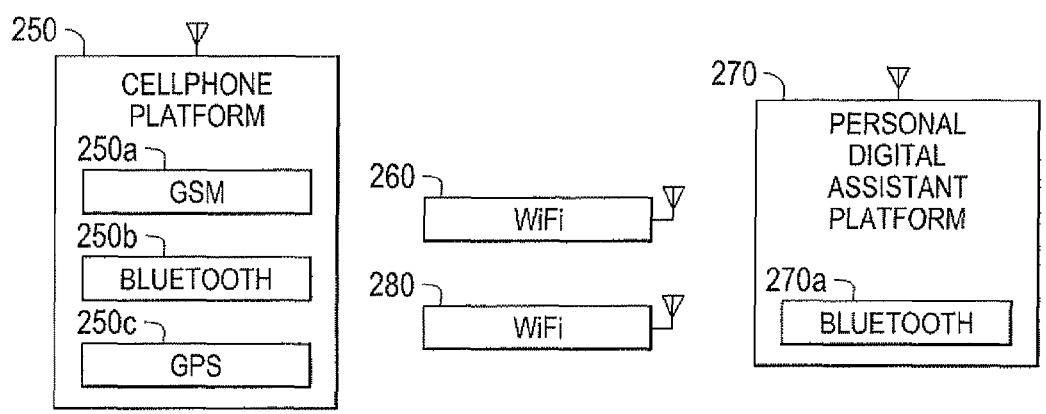
FIG. 2 is another example of a configuration of multiple wireless devices in a shared RF environment.

FIG. 2 shows another example of a configuration 200 of multiple wireless devices in a shared RF environment. The multiple wireless devices can include a cell phone platform 250, a WiFi device 260, a personal digital assistant platform (PDA) 270, and a WiFi device 280. The cell phone platform 250 can include a GSM cell phone 250a, a BT device 250b, and a GPS 250c. The PDA platform 270 can include a BT device 270a.

Either the WiFi device 260, the WiFi device 280, or another WiFi device can serve as an AP. For example, the WiFi device 280 may use the WiFi device 260 as an AP. In another example, the WiFi device 260 can use the WiFi device 280 as an AP.

RF signals from any of the WiFi devices in the configuration 200 can interfere with non-WiFi devices. For example, the WiFi device 260 and the WiFi device 280 can interfere with the GSM cell phone 250a, the BT device 250b, the BT device 270a, and other wireless devices.

Figure 3A:
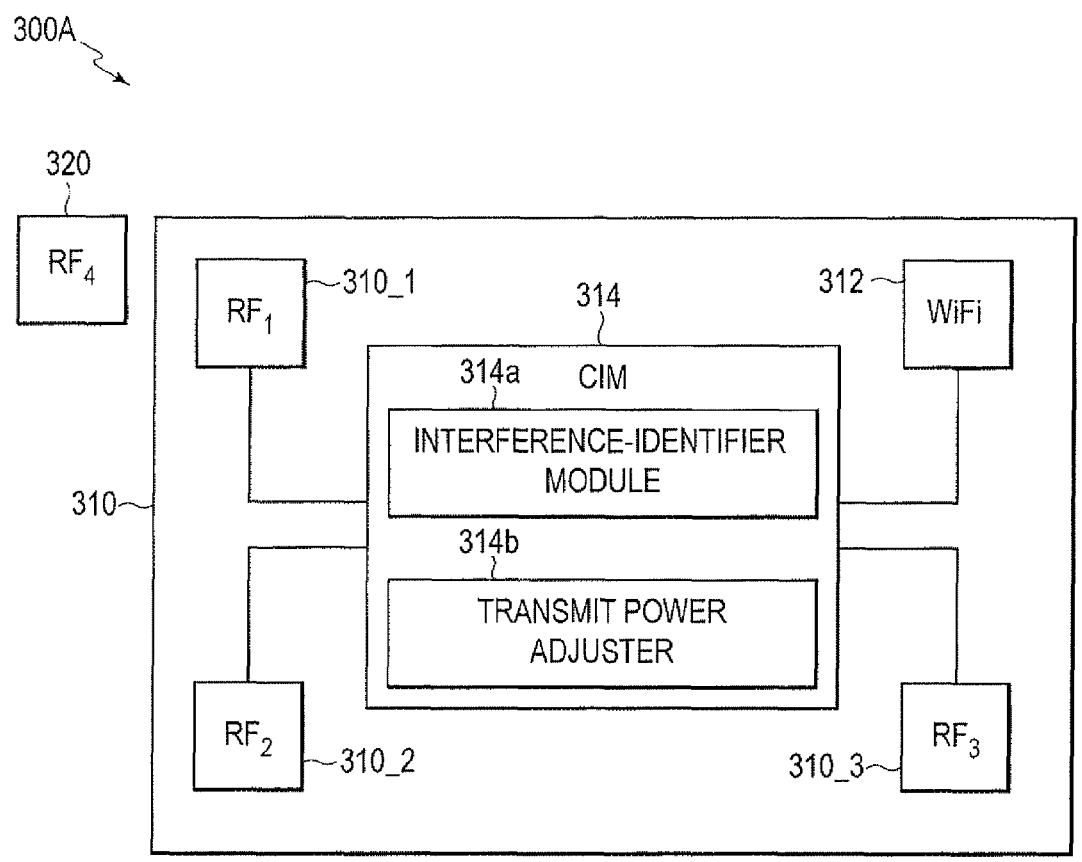
FIG. 3A is a wireless device example that includes a coexistence interference manager (CIM), a WiFi wireless device, and interference-susceptible wireless devices according to an embodiment.

FIG. 3A shows a diagram 300A of a coexistence-managed platform 310, and an external wireless device 320. The coexistence-managed platform 310 can include co-located wireless devices $RF_1$-$RF_3$, a WiFi device 312, and a coexistence interference manager (CIM) 314. The external wireless device 320 can be described as a fourth wireless device that share an RF environment with the co-existence managed platform 310.

The $RF_1$-$RF_3$ can include various cellular phone devices, such as a global positioning system (GPS), a BT device, and the like. The WiFi device 312 can be a WiFi interface, such as an interface that adheres to an IEEE 802.11 specification.

The CIM 314 can interface with the $RF_1$-$RF_3$, WiFi device 312, and the like, within the platform 310. The CIM 314 can be a module within a communication coordination manager (CCM), an application processor, and the like. The CIM 314 may be included in a separate processor such as dedicated processor, a central processing unit (CPU), a digital signal processor (DSP), and the like.

The CIM 314 can include an interference-identifier module 314a and a transmit power adjuster 314b. The interference-identifier module 314a can measure and calculate diverse RF signal characteristics from the $RF_1$-$RF_3$, WiFi device 312, other wireless devices within platform 310 (not shown), and external wireless devices, such as the external wireless device 320. For example, the interference-identifier module 314a can compute a power spectral density (PSD) or a power spectrum, analyze time domain parameters, perform a channel quality measurement, compute a signal-to-noise ratio (SNR) measurement, and the like, to characterize or quantify the RF signals transmitted from co-located wireless devices or external wireless devices.

The transmit power adjuster 314b can adjust the power of an RF signal, for example transmitted by a WiFi device, such as WiFi device 312, to mitigate or reduce coexistence interference caused by the WiFi device to another wireless device.

For example, the transmit power adjuster 314b can command the WiFi device 312 to decrease the RF power transmitted by a WiFi transceiver by 3 dB.

The external device 320 may cause coexistence interference to one or more wireless devices within the platform 310. The wireless device 320 may also be subject to interference from the platform 310, specifically the WiFi device 312. The CIM 314 may determine that the external device 320 is active by measuring the RF signals from any of $RF_1$-$RF_3$, WiFi 312, or other devices. The CIM 314 may adjust the transmit power level used by the WiFi device 312. The adjusted transmit power level may reduce or mitigate coexistence interference caused by the WiFi device 312 to any of the first through third co-located wireless devices 310_1 to 310_3, external device 320, or other wireless devices, whether located in platform 310 or not.

Figure 3B:
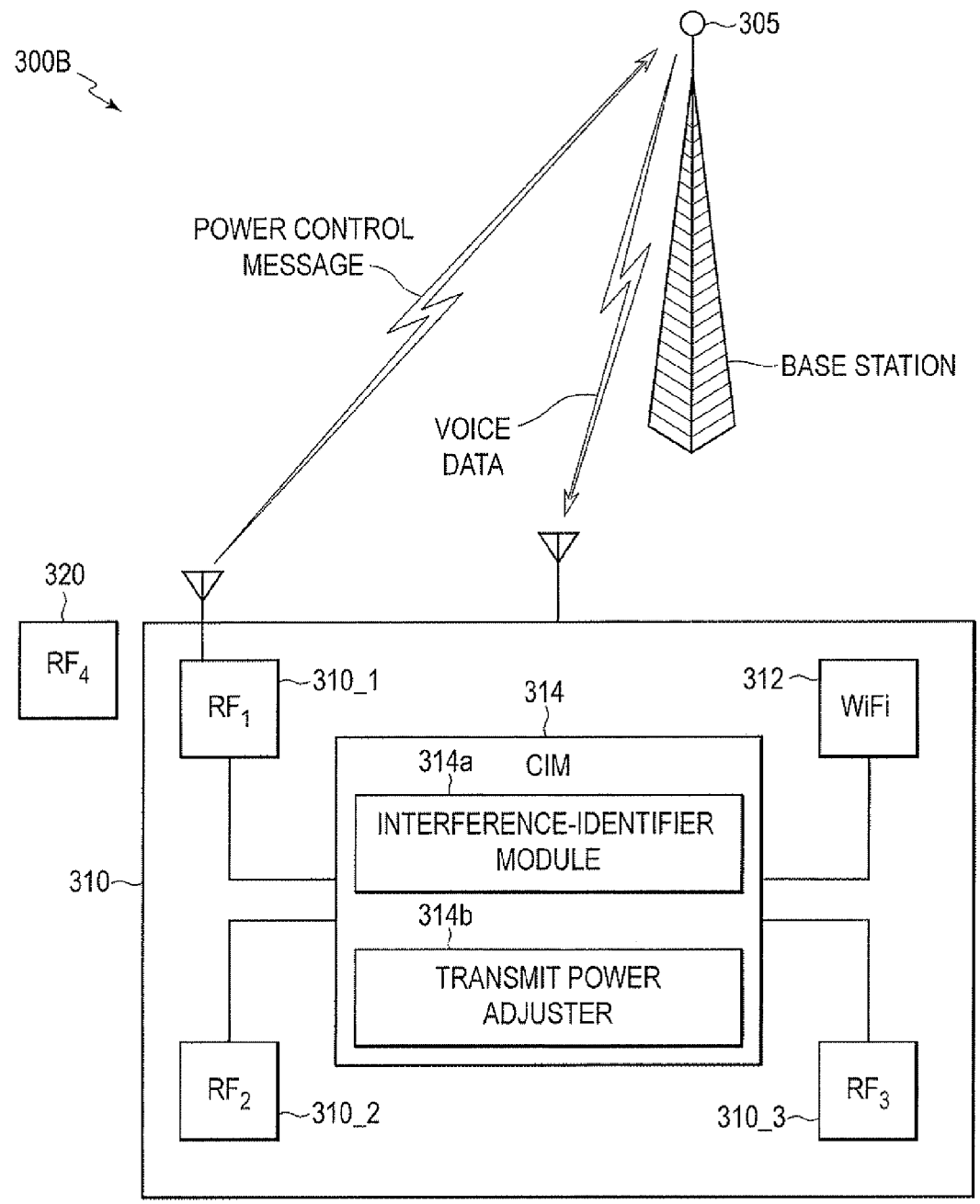
FIG. 3B is another wireless device example that includes a CIM according to an embodiment.

FIG. 3B shows another diagram 300B of a coexistence-managed platform 310 according to an embodiment of the disclosure. The coexistence-managed platform 310 may communicate with a remote transmitter, such as a base station 305, via a shared RF environment. Devices in FIG. 3B which correspond to devices in FIG. 3A are labeled with corresponding numbers and will not be discussed further for brevity.

The coexistence-managed platform 310 in FIG. 3B may include at least one wireless device that may communicate with the remote transmitter via the shared RF environment. For example, the $RF_1$ can be a cell phone that communicates with the base station 305. The communication of the cell phone $RF_1$ and the base station 305 can be a source of an interference in the shared RF environment, or can subject to an interference in the shared RF environment. The interference involving the cell phone $RF_1$ can be detected by the interference-identifier module 314a. When the interference-identifier module 314a detects the interference, a control message indicative of the interference can be transmitted to the base station 305 by the cell phone $RF_1$ or other transmitters. The control message may result in transmitting power adjustment. For example, the base station 305 may transmit voice data to the cell phone $RF_1$ with a reduced power to reduce interference of cellular service to other wireless communication in the shared RF environment.

Figure 3C:
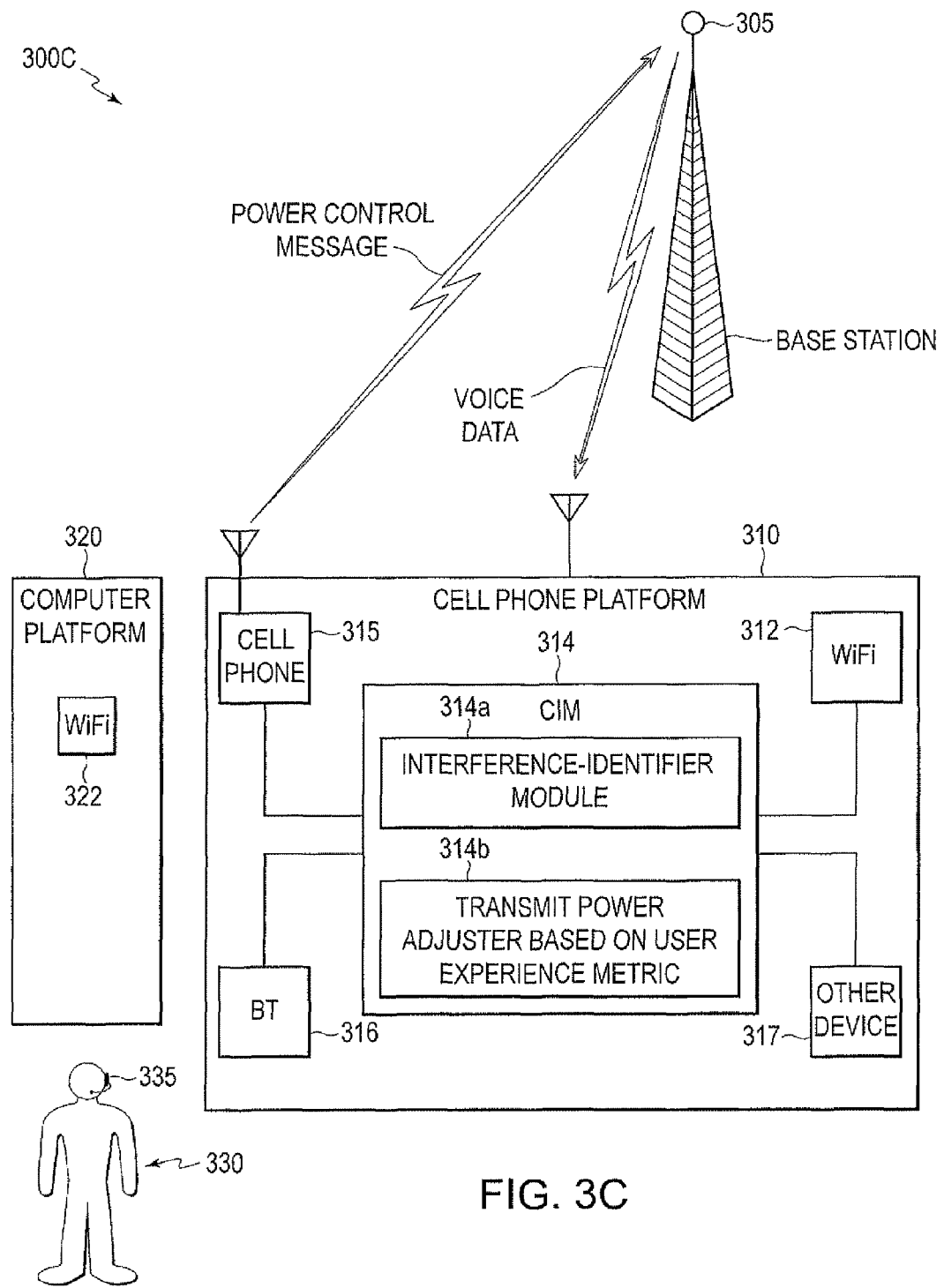
FIG. 3C is a user experience example according to an embodiment.

FIG. 3C shows a user experience example according to an embodiment of the disclosure. A wireless device user may experience communications of multiple wireless devices concurrently. In FIG. 3C, a user 330 may use a computer platform 320 and a cell phone platform 310. The computer platform 320 may include a WiFi device 322. The cell phone platform 310 may include a cell phone device 315, a Bluetooth device 316 and a WiFi device 312. Additionally, the user 330 may wear an earpiece 335 following Bluetooth standard.

The user 330 may transfer data, such as image data, between the computer platform 320 and the cell phone platform 310 via a WiFi communication. The WiFi communication may happen between the WiFi device 322 and the WiFi device 312. Additionally, the user 330 may place a call using a Bluetooth communication and a cell phone communication. The Bluetooth communication can happen between the earpiece 335 and the Bluetooth device 316. The cell phone communication can happen between the cell phone device 315 and the base station 305.

The user 330 may experience communications of multiple wireless devices concurrently. For example, the user 330 may take a phone call while transferring images between the computer platform 320 and the cell phone platform 310. The multiple wireless devices can interfere each other, and deteriorate the user experience, such as high noise phone call, low image transfer rate, and the like.

According to the disclosure, a wireless device may adjust transmit power to mitigate coexistence interference and improve user experience. For example, the cell phone platform 310 may include a CIM 314, which can further include a transmit power adjuster 314b that can adjust transmit power based on a user experience metric that can be a combined signal integrity metric of the multiple communications. The user experience metric can take into account the multiple communications that may happen concurrently, and may mutually interfere each other. The transmit power adjuster 314b may adjust one or more wireless devices transmit power to optimize the user experience metric while keeping all signal integrity metrics above a threshold. Thus, though each of the multiple communications may not have maximized signal integrity, the overall user experience can be optimal.

The CIM 314 can adjust power of wireless devices in the same platform as the CIM 314, or adjust transmit power of wireless devices in a different platform, for example by sending power control message. Additionally, the CIM 314 may adjust transmit power of wireless devices that may be located in a remote distance, such as a cell phone base station 305. According to another aspect of the disclosure, the CIM 314 can adjust the power directly, such as by specifying transmit power, or indirectly, such as by sending suitable interference information in a control message to the wireless device.

Figure 4:
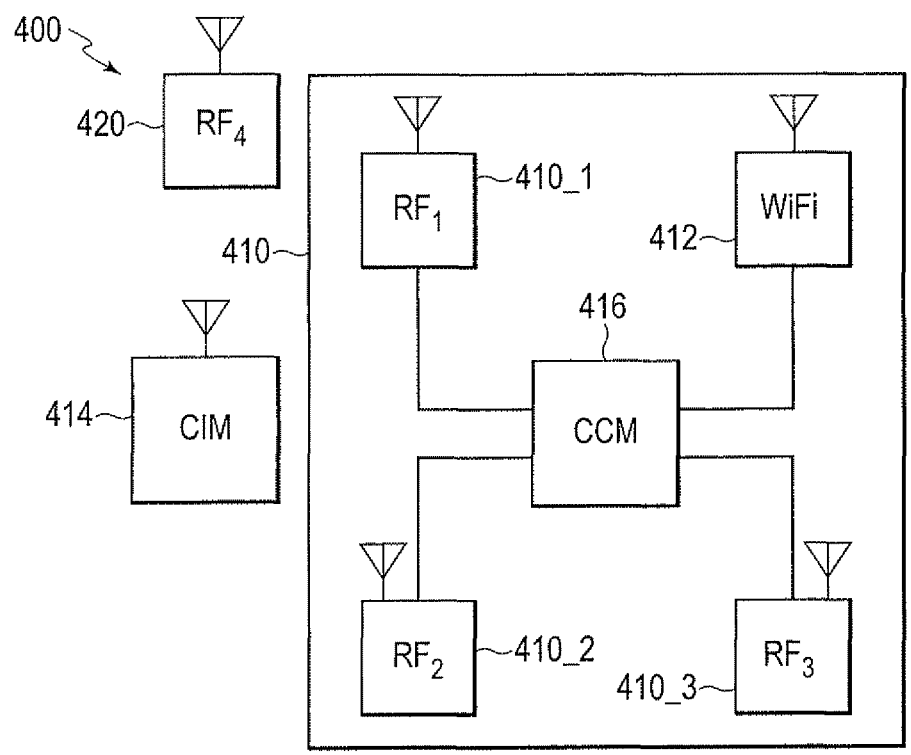
FIG. 4 is a wireless device that includes a coexistence interference manager (CIM), a wireless device that includes a WiFi and a communication co-ordination manager (CCM), and interference-susceptible wireless devices according to an embodiment.

FIG. 4 shows a diagram of a coexistence-managed platform 400 that can include a platform 410, a wireless device 420 and a CIM 414. Devices in FIG. 4 which correspond to devices in FIG. 3A are labeled with corresponding numbers and will not be discussed further for brevity.

Platform 410 can include a CCM 416 that can interface with and manage the wireless devices 410_1 to 410_3, WiFi device 412, and other wireless devices. For example, the CCM 416 can turn a wireless device on or off, enable or disable transmission of an RF signal from a wireless device, detect the activity of a wireless device, such as RF transmission, RF reception, digital processing, analog processing, voltage levels, current levels, and the like. The CCM 416 can allocate platform resources such as memory, communications paths, processor cycles, and the like that may be needed to manage communication to and from the platform 410.

The CIM 414 may be externally located with respect to platform 410. For example, CIM 414 may be located in an AP, a base station (BS), or other wireless device, platform, or system. In another example, the CIM 414 can be included in the external device 420, a WiMax device, a BT device, and the like. The CIM 414 may be part of a system, such as a distributed processor, for detecting and managing coexistence interference to wireless devices on the platform 410 or within RF communications range of the platform 410. For example, CIM 414 can tabulate the susceptibility of each wireless device to interference from neighboring wireless devices and may send commands to platform 410 that change the WiFi device 412 transmit power.

Figure 5:
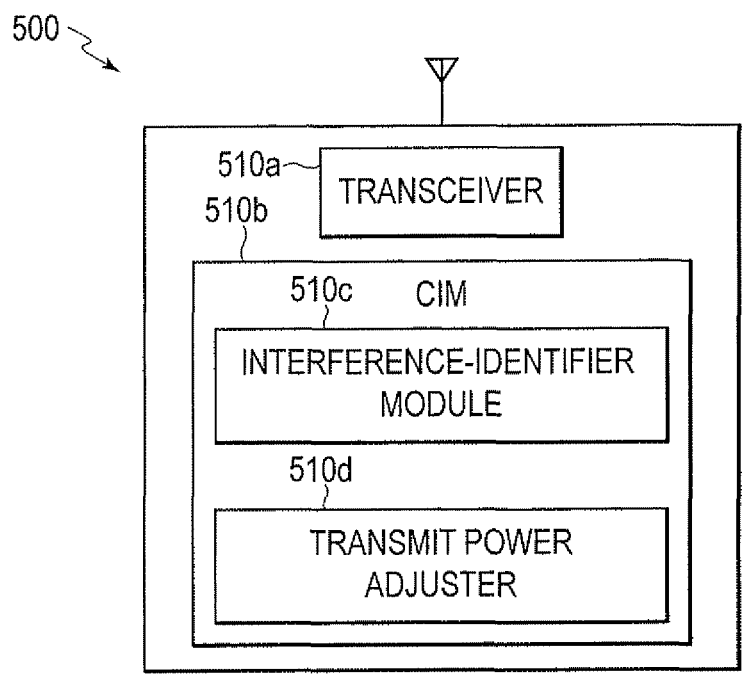
FIG. 5 is a wireless device that includes a transceiver and a CIM according to an embodiment.

FIG. 5 shows an example of a wireless device 500 that can include a transceiver 510a and a CIM 510b. The transceiver 510a can be a cell phone, a BT interface, a WiFi interface, or other suitable wireless device. The CIM 510b can include an interference-identifier module 510c and a transmit power adjuster 510d, that correspond to the interference-identifier module 314a and transmit power adjuster 314b, respectively. The CIM 510b can be a device that performs the function of CIM 314 or CIM 414, described with respect to FIGS. 3A and 4, respectively. It may be noted that the device 500 may be an instance of the $RF_1$-$RF_3$ in FIG. 3A, the WiFi device 312, the external device 320, the external device 420, and the like. In other words, the functions of CIM 314 or CIM 414 may be subsumed in the wireless device 500.

The CIM 510b can account for the susceptibility of the transceiver 510a to coexistence interference and the strength or tendency of the transceiver 510a to cause coexistence interference. For example, when the transceiver 510a is a WiFi device, such as the WiFi device 312 or WiFi device 412, then the CIM 510 can change a WiFi transmit power of the wireless device 500 to mitigate coexistence interference to other wireless devices or caused by other wireless devices.

In another example, the transceiver 510a can be a cell phone component that can communicate with a remote transmitter, such as a base station. The CIM 510b may result in transmitting a control message by the transceiver 510a to the base station. The control message can be indicative of coexistence interference. The base station may receive the control message and adjust transmit power in response to the control message, such that the coexistence interference can be reduced.

Figure 6:
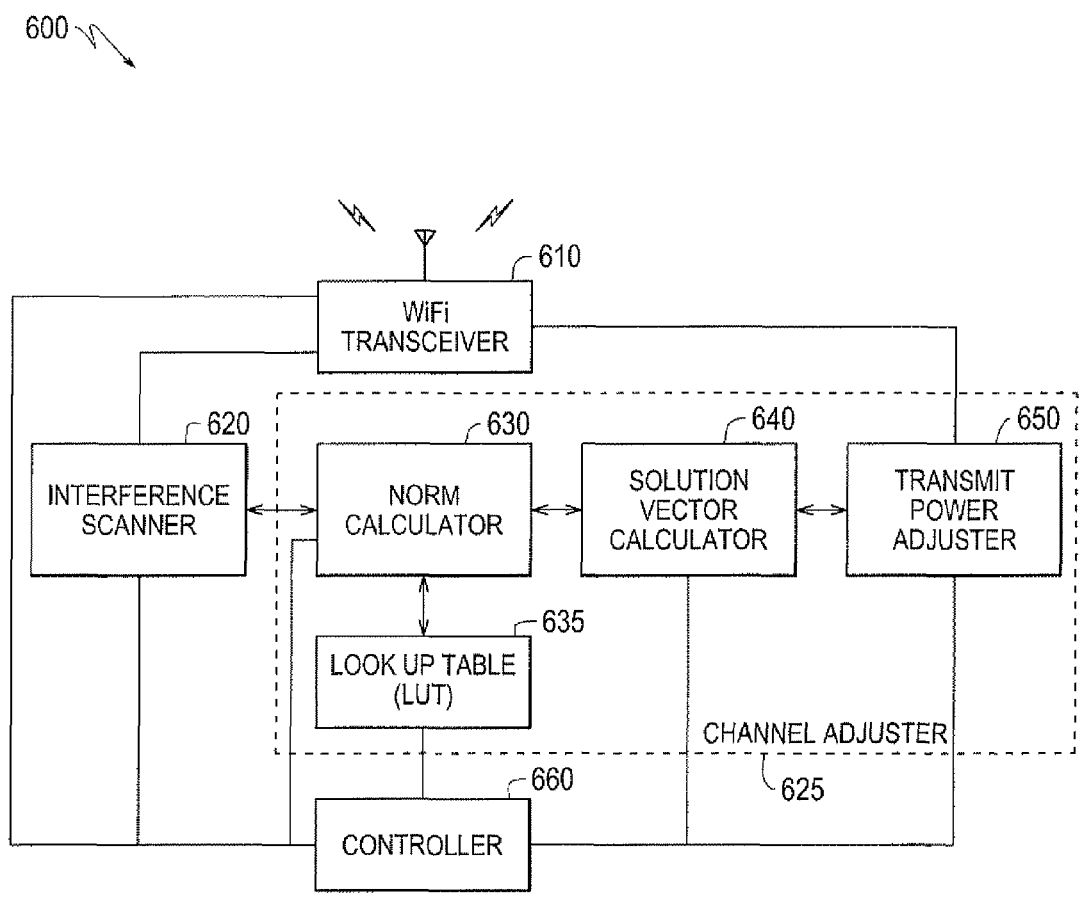
FIG. 6 is a coexistence managed WiFi according to an embodiment.

FIG. 6 shows a wireless device example 600. The wireless device 600 can include a WiFi transceiver 610, an interference scanner 620, a channel adjuster 625 and a controller 660. Further, the channel adjuster 625 may include a norm calculator 630, a look-up table (LUT) 635, a solution vector calculator 640 and a transmit power adjuster 650. These elements can be coupled together as shown in FIG. 6.

The WiFi transceiver 610 can transmit and receive WiFi signals over a common or shared RF environment using signals that comply with WiFi standards. For example, the WiFi transceiver 610 can transmit and receive signals in a 2.4 GHz band, a 5 GHz band, and the like.

The controller 660 may couple control and command signals to and receive data from: the WiFi transceiver 610, the interference scanner 620, the norm calculator 630, the solution vector calculator 640, the transmit power adjuster 650, and the LUT 635. The WiFi transceiver 610 may couple to the interference scanner 620 and the transmit power adjuster 650. The interference scanner 620 may couple to the norm calculator 630. The norm calculator 630 may couple to the solution vector calculator 640, which may be coupled to the transmit power adjuster 650. The norm calculator 630 may couple to the LUT 635.

The interference scanner 620 may request that the WiFi transceiver 610 provide signals or samples from the RF environment. For example, the interference scanner 620 may command the transceiver to tune RF filters, tune RF oscillators, sample data packets, apply chip or pseudo-noise (PN) de-spreading codes, sample a down-converted signal, and the like. The interference scanner 620 may act as an RF spectrum analyzer, a sampling oscilloscope, a time-domain analyzer, a packet analyzer, a polarimeter, and the like. In other words, the interference scanner 620 may act to separate or orthogonalize samples of signals from a commonly shared RF environment. Orthogonal signals can include signals in separate frequency bands, non-overlapping time slots, and the like. The interference scanner 620 may scan the RF environment and aggregate an analysis of the scan into a dataset that is transmitted to the norm calculator 630.

The norm calculator 630 can determine an interference norm or metric that determines the degree of coexistence interference to RF signals received by wireless devices in the shared RF environment. The norm calculator 630 may extract LUT values from the LUT 635. The norm calculator 630 can read the LUT values and divide the scan data provided by interference scanner 620 into data cells that correspond to interfering or potentially interfering permutations, i.e., order-dependent combinations, of wireless devices. For example, the LUT 635 may provide information on the susceptibility of a GSM cell phone to interference by the WiFi transceiver 610, which can differ from the susceptibility of the WiFi transceiver 610 to interference by the GSM cell phone. The norm calculator 630 may analyze the data cells of interfering permutations to determine a metric, such as a worst-case or L1 norm, a square-law or L2 norm, and the like. In other words, the norm calculator 630 may calculate a metric for one or more potentially interfering or currently interfering permutations of wireless devices. The norm calculator 630 can output the norm or interference metric, channel quality indications, a set of identifiers for interference-causing and interference-susceptible devices, and other interference data to the solution vector calculator 640.

The solution vector calculator 640 may search for an RF transmit power level that mitigates or reduces coexistence interference to other wireless devices by the WiFi transceiver 610 while maintaining power at a level that facilitates a connection that exceeds a minimum quality level. For example, the solution vector calculator 640 may determine that the WiFi transceiver 610 should adjust the transmit power of the WiFi 610 to prevent or mitigate interference to external or co-located wireless devices by the WiFi transceiver 610.

The solution vector calculator 640 may also determine that a change in the transmit power can resolve interference on the WiFi transceiver 610 by another wireless device. In other words, the solution vector calculator 640 can determine, for example the best transmit power to mitigate coexistence interference caused by the WiFi transceiver 610. The solution vector calculator 640 can provide a recommended transmit power recommendation to the transmit power adjuster 650.

The transmit power adjuster 650 can change the power of the RF signal transmitted by the WiFi transceiver 610. For example, the transmit power adjuster 650 may request that the WiFi transceiver 610 decrease the RF transmit power by 3 dB.

The controller 660 may send command and control signals to the interference scanner 620, the norm calculator 630, the solution vector calculator 640, the transmit power adjuster 650, and the WiFi transceiver 610. The controller 660 may send predetermined or calculated data on the coexistence interference strength, coexistence interface susceptibility, and other parameters for pairs and higher order permutations of wireless devices. For example, the controller 660 can store information in the LUT 635 on the strength and susceptibility information for a pair including a GSM cell phone and a WiFi.

The controller 660 may determine a time to scan, a scan rate, a scan frequency band, a de-spreading code search sequence, and the like to configure the interference scanner 620. For example, the controller 660 may command the interference scanner 620 to scan frequency bands, time-slots, codes, and the like.

The controller 660 may command the solution vector calculator 640 to iterate to determine a best or recommended solution vector, a next-best solution vector, and the like. For example, the transmit power adjuster 650 may receive an indication that the WiFi transceiver 610 or another wireless device has rejected the mitigation request. The transmit power adjuster 650 may obtain the next-best solution vector from the solution vector calculator 640 and make a subsequent or follow-up request. In other words, the controller 660 may command the solution vector calculator 640 to search for a sequence of solutions. The sequence may be established by a constraint provided by the controller 660, such as a constraint that a power adjustment request was rejected.

It is noted that a wireless device operating in a wireless service other than the WiFi service may be suitably modified according to the given wireless service. For example, a wireless device operating in a cellular service, such as a cell phone, may transmit a control message that is indicative of coexistence interference. The control message can be received by a remote transmitter, such as a base station. The remote transmitter may adjust a transmit power to reduce the coexistence interference. In such example, the wireless device may not include the transmit power adjuster 650.

Figure 7:
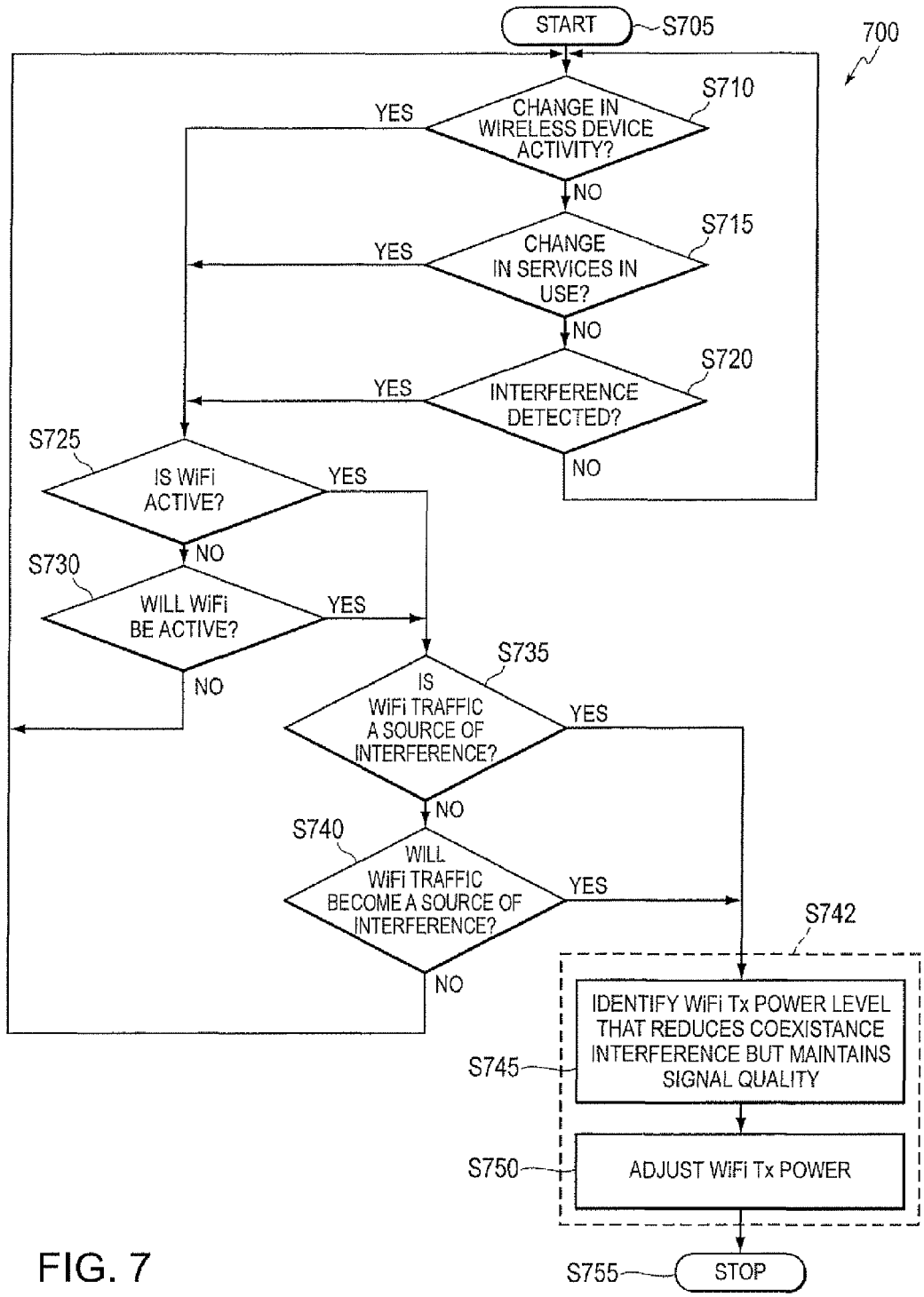
FIG. 7 is a flowchart of a method for managing coexistence interference according to an embodiment.

FIG. 7 shows a flow chart of a method 700 according to an embodiment that includes a start step S705. From program step S705, program flow can proceed to program step S710 in which a change in a wireless device activity is assessed. A wireless device may be a co-located wireless device on a given platform or a wireless device that is external to the platform. A wireless device may be a cellular transceiver, a WiFi device, and the like. A platform can include one or more suitable wireless devices, such as a WiFi device, a cell phone, a global positioning system (GPS), and a BT interface. The program can detect the change in the activity of a wireless device by monitoring an RF emission, a power supply voltage, a status bit, and the like. For example, a wireless device such as a cell phone may be turned on or off once the state of the wireless device is determined by the absence of an RF signal associated with the given wireless device. If no change in the activity of any wireless device is detected, program flow can proceed to program step S715, otherwise program flow can proceed to program step S725.

In program step S715, the program can detect a change in services used by a platform that includes a WiFi device. For example, if a cellular transceiver operates in the platform and the user elects to send pictures on a WiFi link, then a WiFi service may be activated and detected. In this example, the WiFi packets may interfere with cell phone voice-over-IP (VoIP) packets. In other words, the services that a wireless device uses may change dynamically. In another example of a change in service, a platform may include a cell phone that receives a phone call while the user searches the Internet with the cell phone. If no changes in services are detected, the program flow can proceed to program step S720, otherwise the program flow can proceed to program step S725.

In program step S720, the program may detect RF coexistence interference. The program may detect interference from a platform, such as a platform that uses a common RF frequency or band, an external wireless device, or other sources of interference. For example, the program may compare a measured level of interference with a threshold and set a detection flag accordingly. If interference is not detected, the program flow can proceed back to program step S710, otherwise the program flow can proceed to program step S725.

In program step S725, the program can determine whether the WiFi device in the given platform is active. For example, the program can check a status bit on a WiFi status register. If the WiFi device is not active, program flow can proceed to program step S730, otherwise program flow can proceed to program step S735.

In program step S730, the program can determine whether the WiFi device in the given platform will become active. For example, a platform controller may determine that the WiFi device will be activated on a schedule, or may determine that a command has been issued to activate or turn on the WiFi device and the like. If the program determines that the WiFi device will not become active in a predetermined period of time, then the program flow can proceed to program step S710, otherwise the program flow can proceed to program step S735.

In program step S735, the program can determine whether WiFi traffic to or from the WiFi device is a source of interference. For example, the program may determine that the WiFi transmission is a source of interference to co-located wireless device or an external wireless device. If the program determines that the WiFi traffic is not a source of interference, program flow can proceed to program step S740, otherwise the program flow can proceed to program step S745.

In program step S740, the program can assess whether or not activating the WiFi wireless device is likely to produce interference. For example, a controller in a given platform may determine that activating the WiFi device is likely to interfere with cellular telephone traffic, BT traffic, and the like. If the program determines that activating the WiFi device is unlikely to cause interference, program flow can proceed to program step S710, otherwise program flow can proceed to program step S740.

In program step S745, the program can identify a WiFi transmit power level that is likely to reduce coexistence interference but maintain suitable connection quality. The program can store the mitigating transmit power in a register. For example, the program can determine that decreasing the transmit power of the WiFi device by 10 dB will reduce coexistence interference to other devices in the platform or other platforms. From program step S745, program flow can proceed to program step S750.

In program step S750, the platform can adjust the WiFi transmit power according to the mitigating transmit power. For example, the program can adjust the WiFi transmit power downwards by 10 dB to reduce coexistence interference between two or more wireless devices including the WiFi device. The adjustments to the WiFi transmit power may be linear adjustments, logarithmic adjustments, such as decibel (dB) adjustments, and the like. The adjustments may be driven by a look-up table (LUT) such that a predetermined mapping between the mitigating transmit power and the adjusted WiFi transmit power may be implemented. For example, the LUT can store calibration information that relates a mitigating adjustment to a measured, calibrated transmit power. From program step S750, program flow can proceed to program step S755 where program execution can stop.

The program step S745 may be iterative. In other words, a program loop step S742 can combine program steps S745 and S750 to successively generate the mitigating transmit power level as described with respect to FIG. 2.

Figure 8:
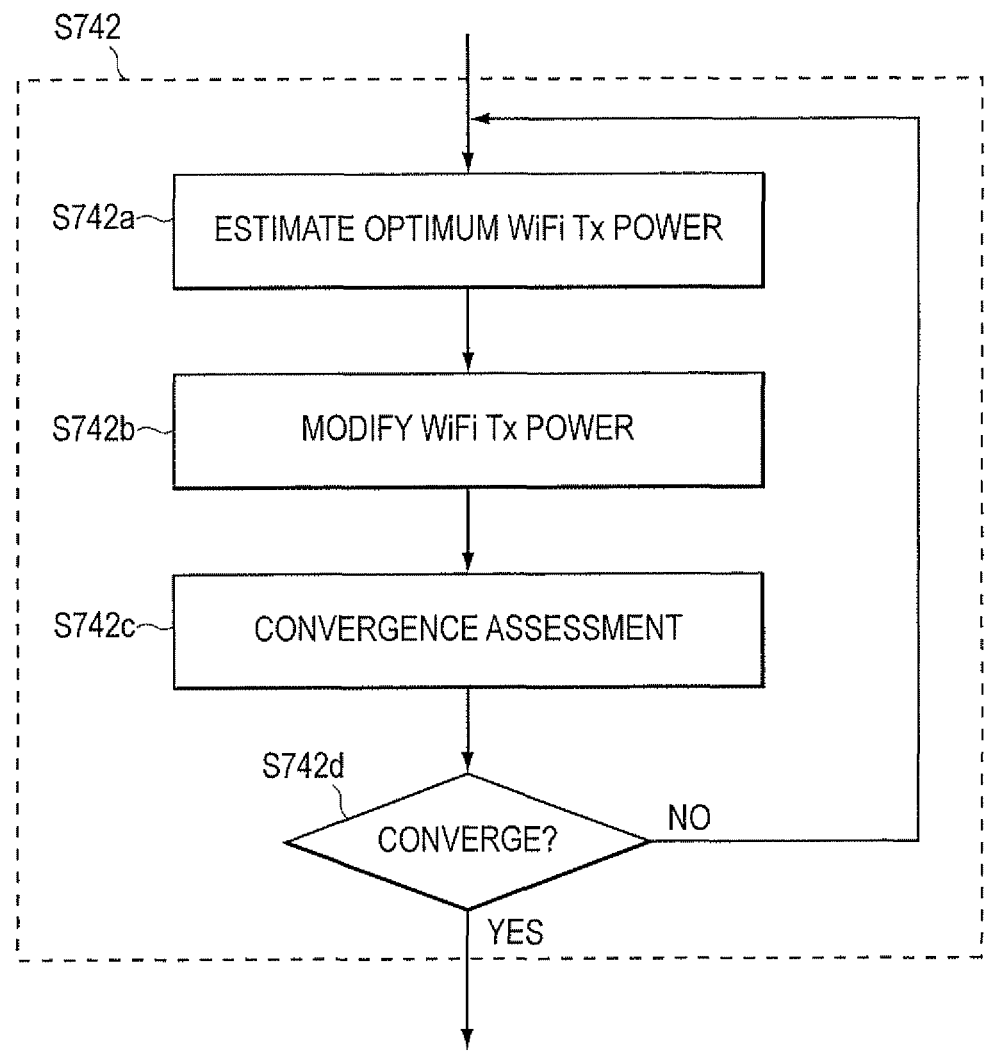
FIG. 8 is a flowchart of a method for changing a transmit power in a wireless device according to an embodiment.

FIG. 8 shows a program flow chart of step S742 that can iterate loop to adjust a mitigating WiFi transmit power. The program can begin at program step S742a in which the program can estimate a coexistence interference-mitigating WiFi transmit power. For example, the program step S742a can determine a performance metric, such as a mini-max metric that minimizes an absolute value or L1 metric, a least-squares or L2 metric, a worst-case or L_infinity metric of interference, and the like. In another example, the program step S742a can determine a frequency at which a maximum amount of interference occurs, and can seek to minimize the expected or estimated value of interference, subject to a minimum WiFi transmit power constraint, that is caused by the WiFi transmitter at that frequency.

From program step S742a, the program can proceed to program step S742b in which the program can modify or adjust the WiFi device transmit power in accordance with the mitigating transmit process. For example, a controller, such as a communications manager (CCM) that manages a set of RF devices on a platform, can adjust a WiFi transmitter to the mitigating transmit power. From program step S742b, the program flow can proceed to program step S742c in which the method can assess the rate of convergence of a coexistence-mitigating loop. In other words, the method can re-measure the level of coexistence interference, and can determine if a rate of convergence or an improvement in a performance metric indicates that coexistence issues are resolved.

From program step S742c, the program flow can proceed to program step S742d in which the convergence assessment can be compared with a convergence threshold. For example, the convergence assessment from program step S742c can be compared with a convergence threshold that indicates a rate of improvement in the performance metric, a reduction in worst-case interference, a root-mean square level of interference, average interference, and the like. For example, in program step S742d, the program can determine whether or not a percentage change in the performance metric, a dB reduction in coexistence interference power, an increase in a channel quality indication (CQI), a decrease in a bit error probability, and the like, has occurred. If not, the program flow can proceed to program step S742a, otherwise the program flow can proceed to step S755 as described with respect to FIG. 7.

According to another aspect of the disclosure, a remote transmitter, such as a base station may adjust transmit power in response to a received control message from a user equipment, such as a cell phone device. Further, the remote transmitter may iteratively adjust the transmit power in response to the received control message from the user equipment.

FIG. 9 shows a coexistence profile data structure 900 that can include a transmitting device type column 910 and receiving device columns 920, 922, 924, and 926 corresponding to a WiFi device, a cell phone, a GPS, and a BT device, respectively. The coexistence profile data structure 900 may be understood in terms of a row and column structure in which a transmitting unit within a platform, such as coexistence-managed platform 310, can transmit an RF signal that may interfere with a cell phone, a UPS, and a BT device, respectively. In other words, coexistence profile data structure 900 may quantify interaction parameters and interaction strategies that mitigate coexistence interference. For example, row 912 and column 922 may quantify the interaction of a WiFi and a cell phone using a set of coexistence parameters. For example, the intersection of row 912 and column 922 may be used to find a profile parameter vector 950 that quantifies 1) the cell phone susceptibility to interference by the WiFi, 2) a cell phone transmitter strength parameter, 3) an adjustment or convergence parameter, and other parameters.

The susceptibility parameter of the profile parameter vector 950 can quantify the susceptibility of the cell phone to interference by the WiFi device. The strength parameter of the coexistence profile parameter vector 950 can quantify the strength of the wireless device, such as a maximum power in dBm, signal strength in normalized units, and the like. The convergence parameter of the coexistence profile parameter vector 950 can quantify a convergence rate, step size, and the like. For example, the convergence parameter can be a desired decrement in a transmitter power, a rate of decrease in a signal to interference ratio, and the like. In a related example, a cell phone that uses the coexistence profile data structure 900 and is parameterized by the profile parameter vector 950 may have 89 units of susceptibility to a WiFi device, may transmit 7 units of power, and may benefit by decrementing the WiFi power by 1 dB per iteration in a coexistence-interference mitigation loop, such as the step S742 described with respect to FIG. 2.

The coexistence profile parameter 955 can quantify the susceptibility, strength, and adjustment strategy or parameters for a WiFi device when subjected to interference by a cell phone. In other words, the effects of coexistence interference need not be symmetrical. For example, as indicated by the intersection of row 914 and column 920, a cell phone may transmit a signal that causes coexistence interference or to a WiFi as shown in profile parameter vector 955. The WiFi may exhibit 71 normalized units of susceptibility to the cell phone based interference, may output a signal at 13 dBm, and may benefit by a 4 dB reduction in cell phone power per loop or iteration when such coexistence interference is detected.

Figure 10:
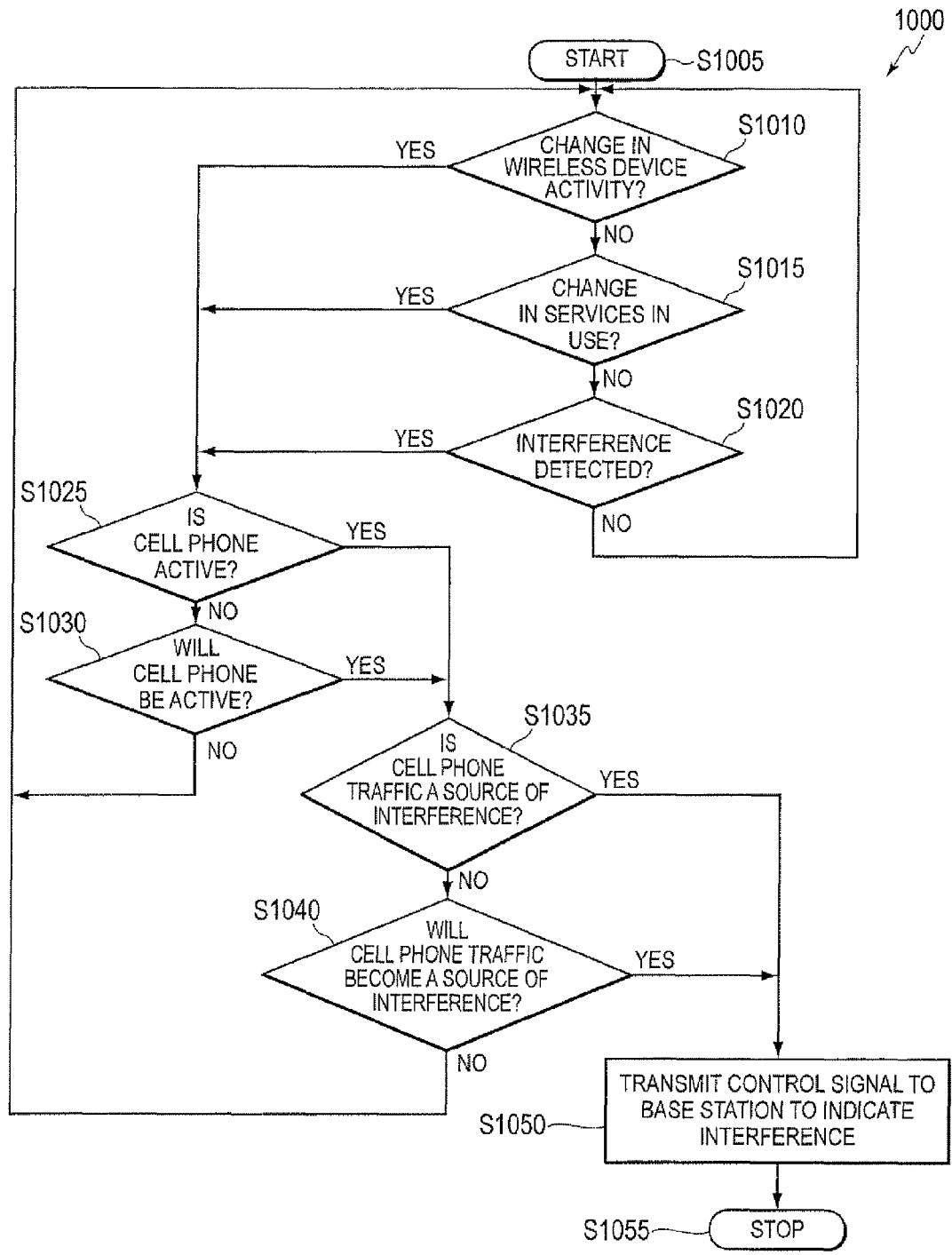
FIG. 10 is a flowchart outlining a method for changing a transmit power in a cellular service according to an embodiment.

FIG. 10 shows a flow chart of a method example 1000 according to an embodiment. The method starts at program step S1005. From program step S1005, program flow can proceed to program step S1010 in which a change in a wireless device activity is assessed. A wireless device may be a co-located wireless device on a given platform or a wireless device that is external to the platform. The platform can include a wireless device that communicates with a remote transmitter as shown in FIG. 3B. The program can detect the change in the activity of the wireless device, for example by monitoring an RF emission, a power supply voltage, a status bit, and the like. If no change in the activity of any wireless device is detected, program flow can proceed to program step S1015, otherwise program flow can proceed to program step S1025.

In program step S1015, the program can detect a change in services used by a platform that includes a cell phone device. In an example of a change in service, a platform may include a cell phone that receives a phone call while the user searches the Internet with the cell phone. If no changes in services are detected, the program flow can proceed to program step S1020, otherwise the program flow can proceed to program step S1025.

In program step S1020, the program may detect RF coexistence interference. The program may detect interference from a platform, such as a platform that uses a common RF frequency or band, an external wireless device, or other sources of interference. For example, the program may compare a measured level of interference with a threshold and set a detection flag accordingly. If interference is not detected, the program flow can return to program step S1010, otherwise the program flow can proceed to program step S1025.

In program step S1025, the program can determine whether the cell phone device in the given platform is active. For example, the program can check a status bit on a cell phone status register. If the cell phone device is not active, program flow can proceed to program step S1030, otherwise program flow can proceed to program step S1035.

In program step S1030, the program can determine whether the cell phone device in the given platform will become active. For example, a platform controller may determine that the cell phone device will be activated on a schedule, or may determine that a command has been issued to activate or turn on the cell phone device and the like. If the program determines that the cell phone device will not become active in a predetermined period of time, then the program flow can return to program step S1010, otherwise the program flow can proceed to program step S1035.

In program step S1035, the program can determine whether cell phone traffic to or from the cell phone device is a source of interference. For example, the program may determine that the cell phone transmission is a source of interference to co-located wireless device or an external wireless device. If the program determines that the cell phone traffic is not a source of interference, program flow can proceed to program step S1040, otherwise the program flow can proceed to program step S1050.

In program step S1040, the program can assess whether or not activating the cell phone wireless device is likely to produce interference. For example, a controller in a given platform may determine that activating the cell phone device is likely to interfere with, for example WiFi traffic, BT traffic, and the like. If the program determines that activating the cell phone device is unlikely to cause interference, program flow can return to program step S1010, otherwise program flow can proceed to program step S1050.

In program step S1050, the program can transmit a control message that is indicative of the identified interference to a remote transmitter, such as a base station. The control message may include, for example, signal integrity metrics corresponding to other wireless devices in the shared RF environment, which may be used by a base station to set transmit power, or a direct power adjustment command. The control message can be received by the base station, and may result in transmitting power adjustment of the base station. The power adjustment of the base station may reduce interference in the shared RF environment.

While the invention has been described in conjunction with the specific exemplary embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A mobile telecommunications platform, comprising:
    a transceiver configured to transmit a first radio frequency (RF) signal at a transmit power, the first RF signal propagating through an RF environment shared by a plurality of interference-susceptible wireless devices, the transceiver being a WiFi device, at least one of the interference-susceptible wireless devices being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);
    an interference-identifier module configured to measure RF signals transmitted from the interference-susceptible wireless devices to detect an interference and to provide a recommended transmit power to a transmit power adjuster; and
    the transmit power adjuster configured to adjust the transmit power based on the recommended transmit power.

2. The mobile telecommunications platform of claim 1, wherein the transceiver operates according to WiFi protocol.

3. The mobile telecommunications platform of claim 1, wherein the interference-identifier module is further configured to determine that the first RF signal affects a signal integrity metric for a second RF signal associated with an interference-susceptible wireless device, the signal integrity metric being at least one of a data retransmission probability, a signal-to-noise ratio, and a signal-to-interference ratio.

4. The mobile telecommunications platform of claim 1, wherein the interference-identifier module is further configured to determine that the first RF signal affects a signal integrity metric for a second RF signal associated with an interference-susceptible wireless device, and the transmit power adjuster is further configured to adjust the transmit power when the signal integrity metric is less than a minimum signal quality.

5. The mobile telecommunications platform of claim 4, wherein the minimum signal quality is at least one of a packet retransmission probability, a bit error ratio, a parity bit, a checksum, a signal-to-noise ratio, and a signal-to-interference ratio.

6. The mobile telecommunications platform of claim 1, wherein the interference-susceptible wireless device comprises a cell phone including at least one of a GSM device, a UMTS device, a PCS device, a long term evolution (LTE) device, a global packet radio system (GPRS) device, an EDGE device, a 1xRTT device, an evolution data only (EV-DO) device, and a code-division multiple access (CDMA) device.

7. The mobile telecommunications platform of claim 1, wherein the first RF signal includes a data packet.

8. The mobile telecommunications platform of claim 7, wherein the transmit power adjuster is further configured to adjust the transmit power before the transceiver transmits the data packet.

9. The mobile telecommunications platform of claim 7, wherein the transmit power adjuster is further configured to adjust the transmit power while the transceiver transmits a plurality of data packets.

10. The mobile telecommunications platform of claim 1, wherein the second RF signal includes an inbound data packet to the interference susceptible wireless device.

11. The mobile telecommunications platform of claim 1, wherein the transmit power adjuster is further configured to adjust the transmit power based on a user experience metric for a combined experience of concurrently using multiple mutually interfere-able wireless devices.

12. A platform that includes the mobile telecommunications platform of claim 1.

13. A method of adjusting a transmit power of a mobile telecommunications platform, comprising:
    transmitting a first radio frequency (RF) signal at the transmit power by a transceiver, the first RF signal propagating through an RF environment shared by a plurality of interference-susceptible wireless devices, the transceiver being a WiFi device, at least one of the interference-susceptible wireless devices being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);
    calculating a signal integrity metric of a second RF signal transmitted between the wireless device and at least one of the plurality of interference-susceptible wireless devices;
    measuring RF signals transmitted from the interference-susceptible wireless devices by an interference-identifier module of the mobile telecommunications platform;
    providing by the interference-identifier module of the wireless device a recommended transmit power to a transmit power adjuster of the mobile telecommunications platform; and
    adjusting by the transmit power adjuster the transmit power based on the recommended transmit power.

14. The method of claim 13, further comprising:
    calculating a signal integrity metric of a second RF signal transmitted between the mobile telecommunications platform and at least one of the plurality of interference-susceptible wireless devices, wherein the signal integrity metric is at least one of a data retransmission probability, a signal-to-noise ratio, a channel quality indication (CQI), a bit error ratio (BER), a block error ratio (BLER), and a signal-to-interference ratio.

15. The method of claim 13, further comprising:
calculating a signal integrity metric of a second RF signal transmitted between the mobile telecommunications platform and at least one of the plurality of interference-susceptible wireless devices; and
adjusting the transmit power when the signal integrity metric is less than a minimum acceptable signal quality.

16. The method of claim 15, wherein the minimum signal quality is at least one of a packet retransmission probability, a BER, a BLER, a parity bit, a checksum, a signal-to-noise ratio, and a signal-to-interference ratio.

17. The method of claim 13, wherein the first RF signal includes a data packet.

18. The method of claim 17, wherein the transmit power is adjusted before transmitting the data packet.

19. The method of claim 18, wherein the transmit power is adjusted while transmitting the data packet.

20. The method of claim 13, wherein adjusting the transmit power further comprises:
adjusting the transmit power based on a user experience metric for a combined experience of concurrently using multiple mutually interfere-able wireless devices.

21. A mobile telecommunications platform, comprising:
a wireless transceiver that transmits a first RF signal at a transmit power, the first RF signal propagating through an RF environment shared by a plurality of interference-susceptible wireless devices, the wireless transceiver being a WiFi device, at least one of the interference-susceptible wireless devices being one of a cellular network compliant mobile transceiver, a WiFi device, a WiMax device, a Bluetooth (BT) device, a Wibree device, a ZigBee device, a wireless USB device, an ultra-wideband (UWB) device, an EnOCcan device, a 6loWPAN device, an iBurst device, and a global positioning system (GPS); and
a coexistence interference manager (CIM) that includes:
an interference-identifier module configured to measure RF signals transmitted from the interference-susceptible wireless devices and to provide a recommended transmit power to a transmit power adjuster; and
the transmit power adjuster configured to adjust the transmit power based on the recommended transmit power.

22. The mobile telecommunications platform of claim 21, wherein the interference-identifier module is further configured to determine if the first RF signal affects a signal integrity metric for a second RF signal transmitted between a first and a second interference-susceptible wireless device, the signal integrity metric being at least one of a data retransmission probability, a signal-to-noise ratio, and a signal-to-interference ratio.

23. The mobile telecommunications platform of claim 21, wherein wireless transceiver and the CIM are co-located on a platform.

24. The mobile telecommunications platform of claim 21, wherein the wireless transceiver and the CIM are located on a first platform and a second platform, respectively.

25. The mobile telecommunications platform of claim 21, wherein the transmit power adjuster is further configured to adjust the transmit power based on a user experience metric for a combined experience of concurrently using multiple mutually interfere-able wireless devices.

26. A method for reducing bit errors in an interference-susceptible wireless device that shares a radio frequency (RF) environment with a mobile telecommunications platform, the method comprising:
transmitting an RF signal by a transceiver of the mobile telecommunications platform, the RF signal propagating through the RF environment shared by the interference-susceptible wireless device, the transceiver being a WiFi device;
detecting an activity status of the interference-susceptible wireless device by monitoring an RF transmission from the interference-susceptible wireless device, the interference-susceptible wireless device being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);
sensing a received signal quality metric of an inbound RF signal to the interference-susceptible wireless device;
measuring an RF signal transmitted from the interference-susceptible wireless device by an interference-identifier module of the mobile telecommunications platform;
providing by the interference-identifier module a recommended transmit power to a transmit power adjuster of the mobile telecommunications platform; and
adjusting by the transmit power adjuster a transmit power from the wireless device based on the recommended transmit power.

27. The method of claim 26, wherein the mobile telecommunications platform is a WiFi device.

28. The method of claim 26, wherein the activity status is at least one of a wireless device power-on status, a wireless device active mode, a wireless device idle mode, a wireless device transition-to-active status, and a wireless device services in use status.

29. The method of claim 28, wherein the activity status changes from a wireless device transition-to-active status to the wireless device active mode after a predetermined time interval.

30. The method of claim 26, wherein sensing the received signal quality metric is at least one of detecting a signal quality uplink from the interference-susceptible wireless device, estimating a present received signal quality from the inbound RF signal and the transmit power, and estimating a future received signal quality from the RF signal and a prospective transmit power.

31. The method of claim 30, wherein the mobile telecommunications platform sets the prospective transmit power based on a signal quality metric.

32. The method of claim 31, wherein the signal quality metric is at least one of a packet retransmission probability, a BER, a BLER, a parity bit, a checksum, and a signal-to-noise ratio.

33. The method of claim 26, wherein the transmit power is at least one of an average RF power and a peak RF power.

34. The method of claim 26, wherein the transmit power is adjusted based on a user experience metric for a combined experience of concurrently using multiple mutually interfere-able wireless devices.

35. A mobile telecommunications platform, comprising:
a WiFi transceiver configured to transmit a first radio frequency (RF) signal at a transmit power to a WiFi enabled device through an RF environment shared by an interference-susceptible wireless device, the interference-susceptible wireless device being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);

an interference identifier module configured to measure an RF signal transmitted from the interference-susceptible wireless device and to provide a recommended transmit power to a transmit power adjuster; and the transmit power adjuster configured to adjust the transmit power based on the recommended transmit power.

36. The mobile telecommunications platform of claim 35, wherein the interference identifier module is further configured to determine whether the transmit power is likely to affect a signal integrity metric for a second RF signal received by the interference-susceptible wireless device, and the transmit power adjuster is further configured to adjust the transmit power to increase the signal integrity metric.

37. The mobile telecommunications platform of claim 35, wherein the interference identifier module is further configured to determine whether the transmit power is likely to affect a signal integrity metric for a second RF signal received by the interference-susceptible wireless device, and the transmit power adjuster is further configured to adjust the transmit power to increase a user experience metric that factors in the signal integrity metric and a reception quality of RF signals transmitted by the WiFi transceiver.

38. The mobile telecommunications platform of claim 35, wherein the WiFi enabled device is configured as an access point (AP), and the WiFi transceiver is configured as a remote device.

39. The mobile telecommunications platform of claim 35, wherein the WiFi enable device is configured as a remote device, and the WiFi transceiver is configured as an AP.

40. The mobile telecommunications platform of claim 35, wherein the interference-susceptible wireless device includes at least one of a cell phone, a BT device, a WiMax device, and a global positioning system (GPS).

41. The mobile telecommunications platform of claim 35, wherein the interference identifier module is further configured to determine whether the transmit power is likely to affect a signal integrity metric for a second RF signal received by the interference-susceptible wireless device, the signal integrity metric being at least one of a data retransmission probability, a signal-to-noise ratio, and a signal-to-interference ratio.

42. The mobile telecommunications platform of claim 35, wherein the transmit power adjuster is further configured to adjust the transmit power so an AP signal quality exceeds a minimum AP signal quality.

43. The mobile telecommunications platform of claim 42, wherein the AP signal quality is at least one of a packet retransmission probability, a bit error ratio, a block error ratio, a parity bit, a checksum, a signal-to-noise ratio, a signal-to-interference ratio, and a channel quality indicator.

44. The mobile telecommunications platform of claim 35, wherein the first RF signal includes a data packet.

45. The mobile telecommunications platform of claim 44, wherein the transmit power adjuster is further configured to adjust the transmit power before the WiFi transceiver transmits the data packet.

46. The mobile telecommunications platform of claim 45, wherein the transmit power adjuster is further configured to adjust the transmit power while the WiFi transceiver transmits the data packet.

47. A mobile telecommunications platform for use in a shared radio frequency (RF) environment, comprising:

an RF interface that receives and transmits radio signals at a transmit power according to a first wireless service within the shared RF environment, wherein the shared RF environment includes interference susceptive devices that operate according to at least a second wireless service that is different from the first wireless service, the RF interface being a WiFi device, at least one of the interference susceptive devices being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);

an interference identifying module associated with the RF interface to measure RF signals transmitted from the interference susceptive devices and to provide a recommended transmit power to a transmit power adjuster; and the transmit power adjuster configured to adjust the transmit power based on the recommended transmit power.

48. The mobile telecommunications platform of claim 47, wherein the mobile telecommunications platform is configured as a cell phone that operates according to a cellular network service.

49. A cellular network providing a cellular service in a shared radio frequency (RF) environment, comprising:

a mobile telecommunications platform, the mobile telecommunications platform including:

an RF interface that receives and transmits radio signals according to the cellular service within the shared RF environment, wherein the shared RF environment includes interference susceptive devices that operate according to at least a wireless service that is different from the cellular services, the RF interface being a WiFi device, at least one of the interference susceptive devices being one of a cellular network compliant mobile transceiver, a WiFi device, a WiMax device, a Bluetooth (BT) device, a Wibree device, a ZigBee device, a wireless USB device, an ultra-wideband (UWB) device, an EnOCean device, a 6loWPAN device, an iBurst device, and a global positioning system (GPS);

an interference identifying module associated with the RF interface to measure RF signals transmitted from the interference susceptive devices and to provide a recommended transmit power to a transmit power adjuster; and the transmit power adjuster configured to adjust the transmit power based on the recommended transmit power.

\* \* \* \* \*